US006715213B2

(12) United States Patent
Richter

(10) Patent No.: US 6,715,213 B2
(45) Date of Patent: Apr. 6, 2004

(54) 3D ANGLE MEASUREMENT INSTRUMENT

(76) Inventor: Lars Richter, 3724 Redfox Rd., Trinity, NC (US) 27370

( * ) Notice: Subject to any disclaimer, the term of this patent is extended or adjusted under 35 U.S.C. 154(b) by 101 days.

(21) Appl. No.: 10/036,552

(22) Filed: Dec. 31, 2001

(65) Prior Publication Data

US 2003/0019294 A1 Jan. 30, 2003

Related U.S. Application Data

(60) Provisional application No. 60/307,918, filed on Jul. 27, 2001.

(51) Int. Cl.$^7$ ............................................... G01C 19/00
(52) U.S. Cl. ...................................... 33/328; 33/275 G
(58) Field of Search ........................... 33/275 R, 275 G, 33/283, 318, 328, 329, 343, 365, 366.11, 366.12, 366.13, 366.14, DIG. 21; 73/504.12, 504.13, 504.14, 504.15, 504.16, 493; 356/459; 340/689

(56) References Cited

U.S. PATENT DOCUMENTS

| | | | |
|---|---|---|---|
| 4,151,656 A | | 5/1979 | Hensley |
| 5,150,104 A | * | 9/1992 | Thomas et al. .......... 33/366.19 |
| 5,331,404 A | * | 7/1994 | Moeller et al. ............. 356/460 |
| 5,375,336 A | * | 12/1994 | Nakamura ................... 33/324 |
| 5,394,616 A | | 3/1995 | Claxton |
| 5,531,031 A | | 7/1996 | Green |
| 5,539,990 A | | 7/1996 | Le |
| 5,713,135 A | | 2/1998 | Acopulos |
| 5,842,282 A | | 12/1998 | Ting |
| 6,163,969 A | | 12/2000 | Jan et al. |
| 6,230,416 B1 | | 5/2001 | Trigilio |
| 6,354,011 B1 | * | 3/2002 | Albrecht ...................... 33/318 |

FOREIGN PATENT DOCUMENTS

| | | | |
|---|---|---|---|
| GB | 2157433 A | | 10/1985 |
| JP | 01136010 A | * | 5/1989 |
| JP | 01147314 A | * | 6/1989 |
| JP | 09071742 A | * | 3/1997 |
| JP | 11311516 A2 | | 11/1999 |

OTHER PUBLICATIONS

MicroSensors, Silicon MicroRing Gyro, available as of filing date.
Monolitsystem AB, Micro–Mechanics, available as of filing date.
Heli–Max, Heli Micro Piezo Gyro, available as of filing date.
Maxx Products International, Inc., Piezo Gyro, available as of filing date.
Pacific Laser Systems, available as of filing date.
World Star Technologies, Inc., Laser Level, available as of filing date.
Laserliner, Laser Level–Laser–Wasserwaage, available as of filing date.
Roto Laser System, available as of filing date.
Stabila Levels, Laserspirit Level, available as of filing date.
Pro Shot Lasers, L3 Manual Visible Beam Laser, available as of filing date.

* cited by examiner

*Primary Examiner*—Diego Gutierrez
*Assistant Examiner*—Tania C. Courson
(74) *Attorney, Agent, or Firm*—Womble Carlyle Sandridge & Rice, PLLC

(57) ABSTRACT

A 3D angle measurement instrument includes a casing having a top and bottom with side walls extending therebetween. A gyroscope is positioned within the casing and electrically connected to a battery power source. The gyroscope is capable of measuring acceleration and deceleration velocities of the casing indicative of angular rotation thereof. A microprocessor is positioned within the casing and is electrically connected to the gyroscope and battery. The microprocessor receives an output signal from the gyroscope and is capable of calculating an angular displacement value using the output signal and a corresponding time factor. The angular displacement value is displayed on an electronic display in angular degrees from a reference point.

18 Claims, 6 Drawing Sheets

3D ANGLE MEASUREMENT INSTRUMENT

CROSS REFERENCE TO RELATED APPLICATIONS

This application claims the benefit of the prior filed, provisional application Serial No. 60/307,918, filed Jul. 27, 2001, entitled 3D Level.

BACKGROUND OF THE INVENTION

This invention relates generally to angle measuring and positioning devices and, more particularly, to an angular measurement instrument for measuring angles in three dimensions relative to a user-selected reference plane.

Conventional bubble levels are routinely used by carpenters, builders, plumbers, pipe fitters, and other tradesmen for determining if a surface is horizontal relative to the Earth's surface or if a vertical surface is at 90° or at a right angle with respect to a known horizontal surface. However, conventional levels are not useful for determining angles measuring more or less than 90° or for verifying a right angle where the reference plane is not truly level. Further, conventional levels only determine inclination in two-dimensional space and relative to the Earth's gravitational environment. For example, these instruments are not useful in positioning a standalone air conditioning unit or other machine at precisely a 45° angle relative to the wall.

Therefore, it is desirable to have a self-contained angular measurement instrument for measuring angular displacement on the horizontal plane (i.e. on any plane-axis). Further, it is desirable to have a measurement instrument for determining angular displacement from a user-selected reference point, e.g. from a wall, floor, or other object. In addition, it is desirable to have an angular measurement instrument which audibly indicates each time a stored angular displacement is indicated.

SUMMARY OF THE INVENTION

A 3D angle measurement instrument according to the present invention includes a casing with a battery power source positioned therein. A gyroscope is also positioned within the casing and electrically connected to the battery. Similarly, a microprocessor is positioned in the casing and connected to both the battery and the gyroscope. The gyroscope is capable of sensing acceleration and deceleration velocities relative to angular movements of the casing. An output signal indicative of respective velocity data is delivered from the gyroscope to the microprocessor. Using the calculus technique of integration applied to the output signal and a corresponding time factor, the microprocessor is capable of determining an angular displacement value. This angular displacement value is relative to a reference plane (i.e. a starting surface). The angular displacement value may be displayed on an electronic display as a number of degrees offset or displaced from the reference plane (e.g. 31.2° from a support beam) or may be interfaced to external equipment as an analog output or RS232 communication. The reference point may be selected and set by a user. Upon positioning the casing on a selected surface, the user may depress a reset button to zero out the display. That surface is considered the reference plane from which subsequent measurements are offset.

Therefore, a general object of this invention is to provide an angular measurement instrument which calculates the angular inertia displacement of any surface or plane positioned on any axis relative to a reference plane.

Another object of this invention is to provide an instrument, as aforesaid, which can determine the angular relationship of one geometric plane relative to a known geometric plane.

Still another object of this invention is to provide an instrument, as aforesaid, which measures angular inertia without being influenced by gravity or magnetic forces.

Yet another object of this invention is to provide an instrument, as aforesaid, in which the reference plane from which angular displacement is measured may be set by a user.

A further object of this invention is to provide an instrument, as aforesaid, which can store at least one angular displacement value in memory and audibly indicate when a subsequently calculated angular displacement value equals the stored angular displacement value.

A still further object of this invention is to provide an instrument, as aforesaid, which includes a laser module for selectively projecting a light beam along an imaginary axis according to the angle defined by the relative position of the casing.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
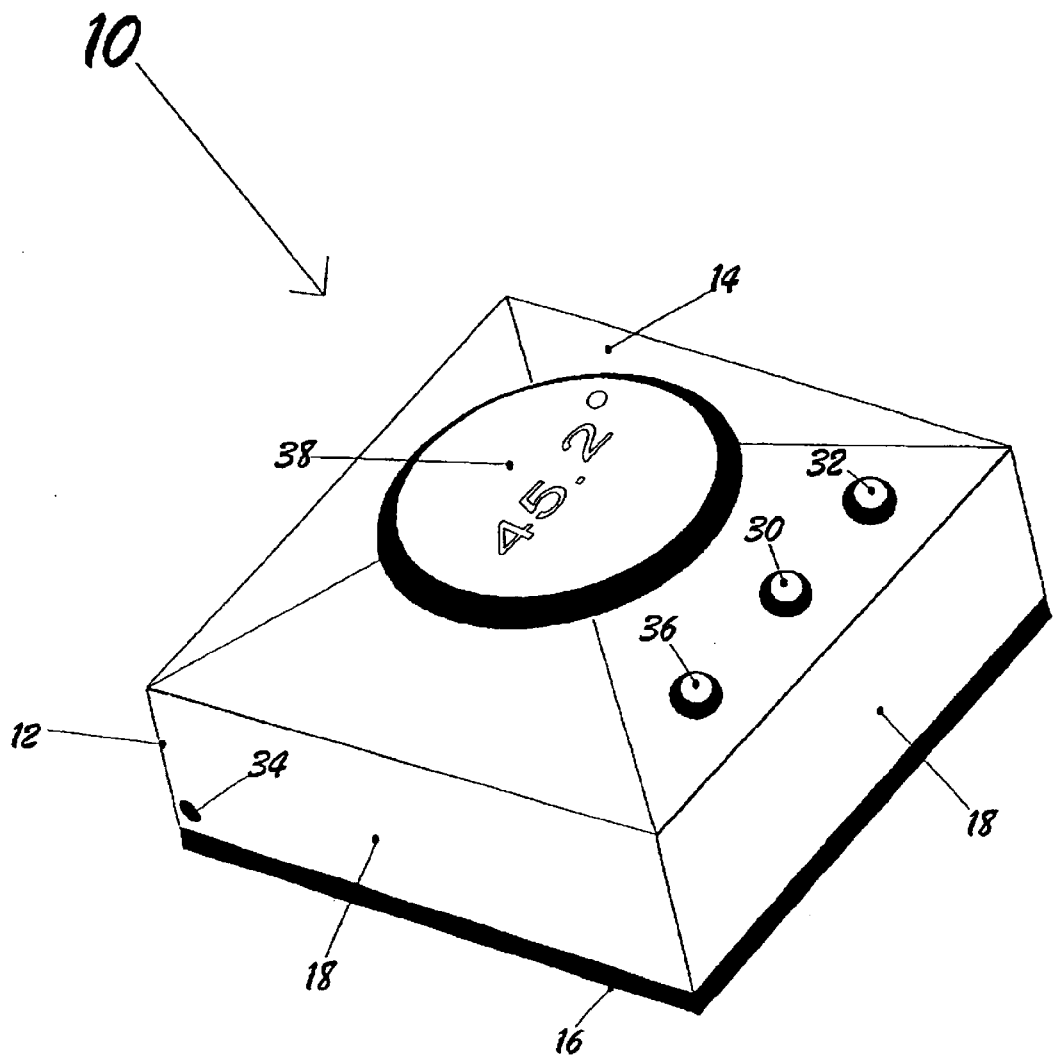
FIG. 1 is a perspective view of a 3D angular measurement instrument according to one embodiment of the present invention.

A 3D angular measurement instrument 10 according to one embodiment of the present invention will now be described in detail with reference to the accompanying drawings. Referring to FIG. 1, the instrument 10 includes a casing 12 having top 14 and bottom 16 walls with side walls 18 intermediate the top 14 and bottom 16 walls. The casing 12 defines an interior space and includes a generally square-shaped configuration although other configurations having at least one planar surface would also be suitable.

Figure 1A:
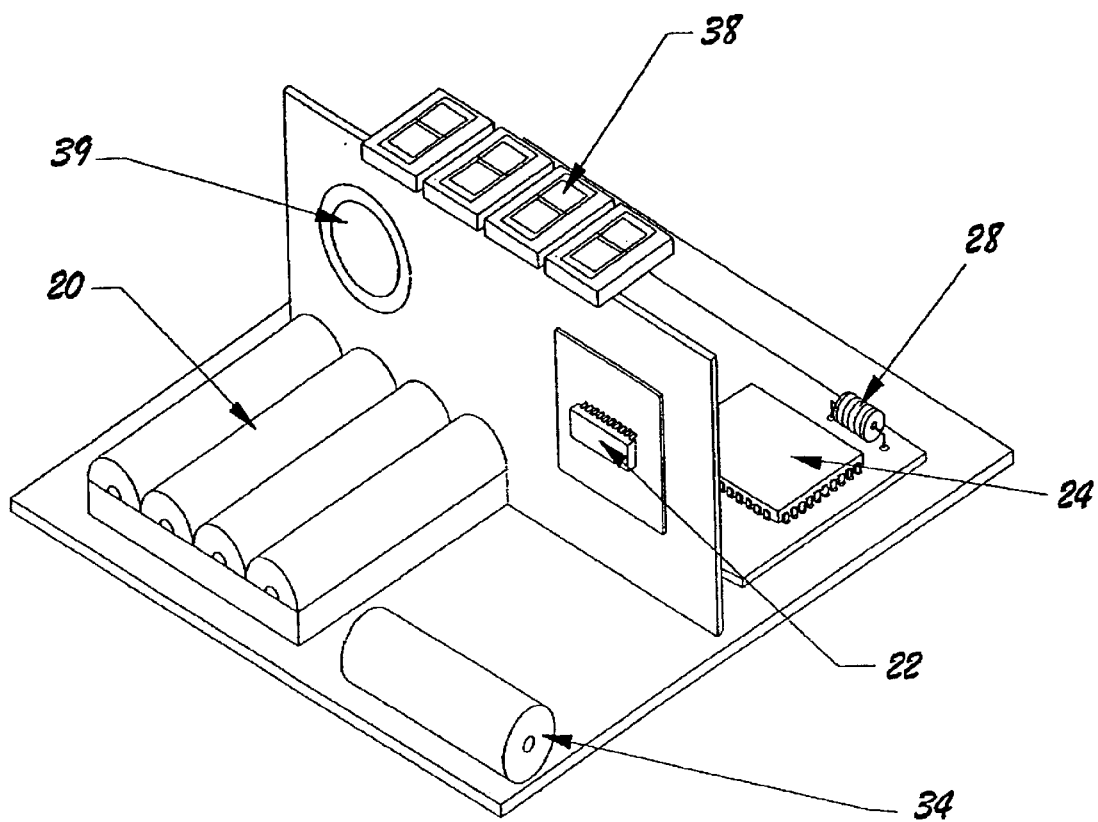
FIG. 1A is a perspective view of the internal components of the instrument as in FIG. 1.

As shown in FIG. 1A, a battery power source 20 is positioned within the interior space of the casing 12. The battery or batteries are removable, replaceable and may even be rechargeable. Obviously, other power sources could be utilized, such as solar or AC/DC power.

Further, a gyroscope 22 is mounted within the interior space of the casing 12 and is electrically connected to the power source 20. While conventional accelerometers produce a signal relative to linear acceleration motion, gyroscopes produce signals relative to rotational acceleration motion. Preferably, the gyroscope 22 is a MEM (microelectromachined) gyroscope, although other types of gyroscopes would be suitable as well as to be more fully described later. A MEM gyroscope is capable of measuring acceleration and deceleration forces caused by rotational velocity and generating a corresponding analog output signal. Movement of the MEM gyroscope produces a predetermined corresponding voltage corresponding to the rotational velocity. The angular displacement indicated by this voltage is determined as described below.

More particularly, the MEM gyroscope 22 is a highly sensitive angular rate of rotation sensor that is based on the Coriolis tuning fork gyroscope principle. It includes a micromachined gyro sense element and operates at low power and with a low noise factor. The voltages generated by angular movement of the gyroscope 22 may be analyzed in relation to time to provide an extremely accurate inertia angular displacement value from a reference plane, as to be described more fully below.

A microprocessor 24 capable of high speed mathematical operations is mounted within the interior space of the casing 12 and is electrically connected to the power source 20 and the gyroscope 22 for receiving the output signal generated by the gyroscope 22. Preferably, the microprocessor 24 is a programmable microcontroller although it may also be an application specific integrated circuit ("ASIC"). The microprocessor 24 includes an analog-to-digital converter and timers. Thus, the analog signal is converted into a plurality of digital values at predetermined time intervals (i.e. the sampling period). Using the calculus technique of integration, the microprocessor 24 calculates an angular displacement value using the digital values over a predetermined time interval, e.g. every 8 msec. The angular displacement value is represented as a measurement in degrees for display as the number of degrees offset or displaced from a zero degree reference plane. In other words, the integrated displacement value is displayed as an angle relative to a reference surface. The microprocessor 24 in conjunction with the gyroscope 22 is capable of determining a displacement value with a resolution ranging from 0.01 to 5 degrees of accuracy. An electronic display 38 is mounted to the top wall 14 of the casing 12, such as a liquid crystal or light emitting diode display, and is electrically connected to the microprocessor 24. It should be appreciated that the display 38 is not essential to the instrument 10 as a calculated displacement value may be electrically delivered to an external display or other external equipment in the form of an analog signal or using an RS232 transmission connection or the like.

The measurement instrument 10 includes at least one signal filter 28 positioned intermediate the gyroscope 22 and microprocessor 24 for reducing electronic "noise" from the output signal and inaccuracies caused by human hand vibrations and the like. The microprocessor may include other filtering routines relative to the analog-to-digital data conversion or for other signal conditioning.

Figure 2:
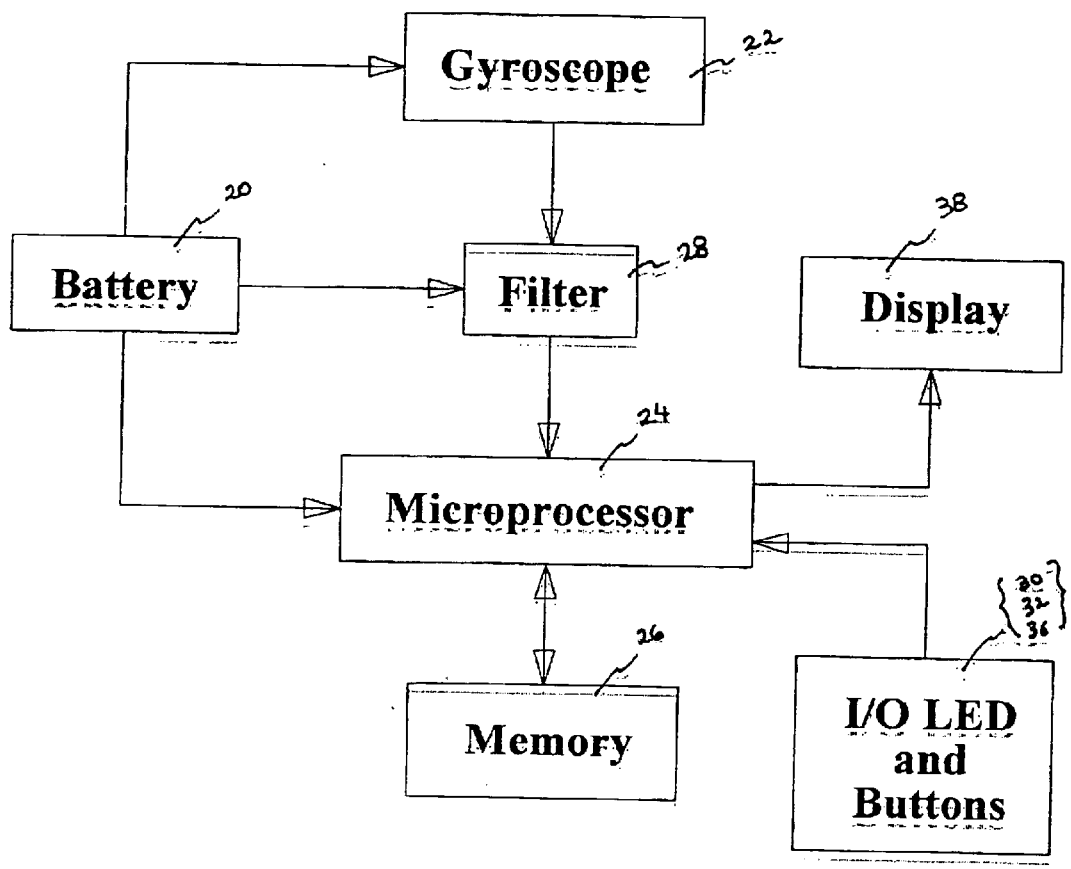
FIG. 2 is a block diagram of the internal components of the instrument as in FIG. 1.
Figure 5:
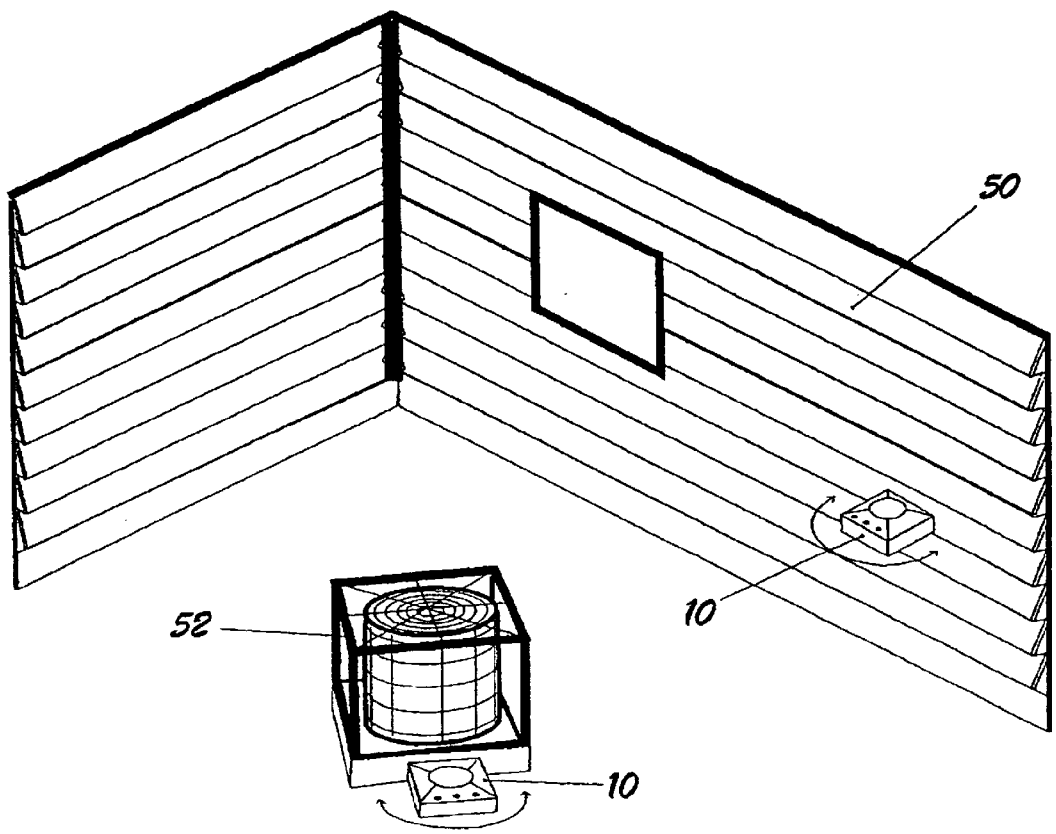
FIG. 5 is a perspective view of the instrument as in FIG. 1 in use in positioning equipment relative to a wall.

A "reset" button 30 is mounted to the casing 12 (FIG. 1) and is electrically connected to the microprocessor 24 (FIG. 2). A user depression of the reset button 30 zeros out the display 38 and establishes a reference point from which an angular displacement value calculated from subsequent output signals may be offset. For example, a user may position the casing 12 against an upstanding wall and then press the reset button 30 to establish a reference plane. Then, the user may rotate the casing 12 within the reference axis or place it against another object and the display 38 will show the angle of that object relative to the wall. For example, FIG. 5 illustrates how a wall 50 may be established as a reference plane and then how a desired angle of displacement therefrom may be determined by rotating the casing 12 within the reference plane. This allows a desired object (e.g. an air conditioning unit 52) to be positioned at a desired angle relative to the wall 50. In another application, the casing 12 may be placed against another upstanding wall to determine whether that wall is parallel to the reference wall, etc.

Figure 4:
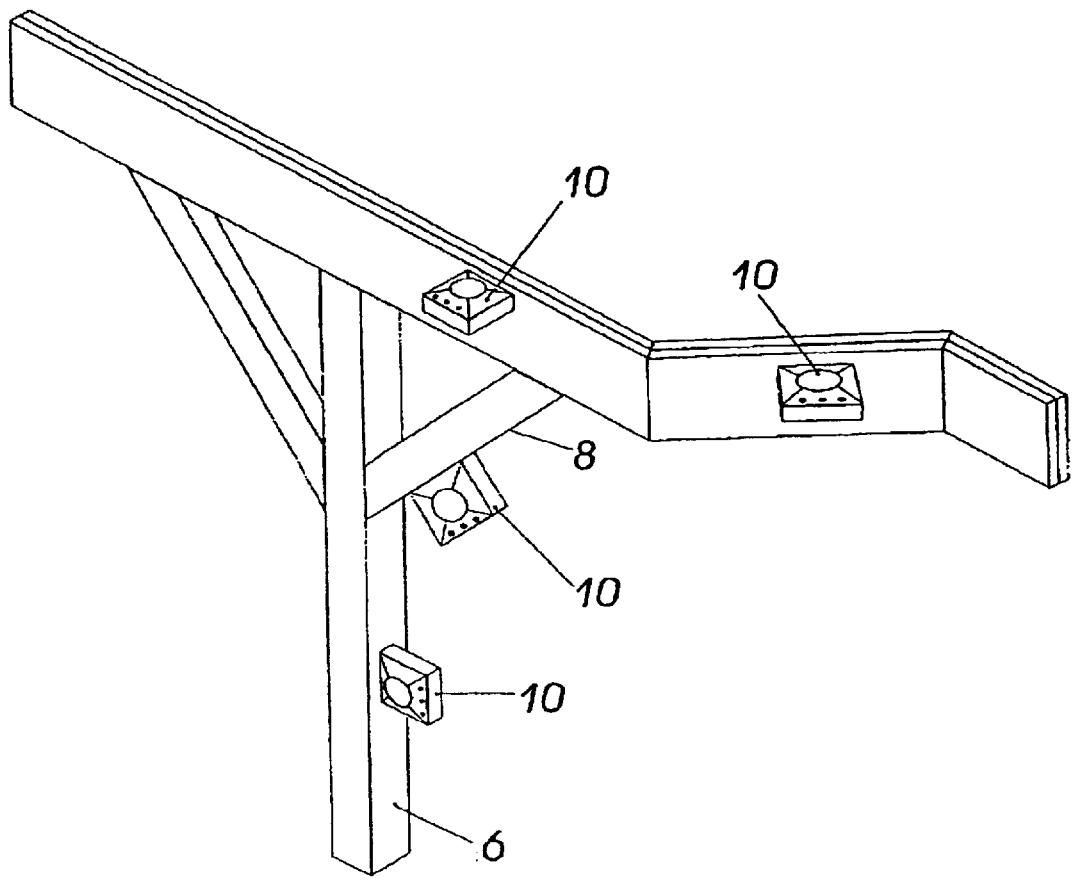
FIG. 4 is a perspective view of the instrument as in FIG. 1 in use in a construction application.

It is understood that the second plane must be on the same axis as the reference plane in order to ensure an accurate gyroscopic measurement. For example, if a side wall 18 of the casing 12 bears against the reference surface when the reference plane is established (by pressing the reset button), then the same side wall 18 must also bear against the second surface as shown in FIG. 4. However, errors caused by moving the gyroscope along an axis other than that of the reference plane may be overcome using a tilt sensor positioned within the casing in electrical communication with the microprocessor.

In addition, the casing 12 may be rotated relative to a reference plane until the display 38 indicates a desired angle. For example, a carpenter may know that a support beam needs to be attached to the reference surface at a 47° angle. The 3D angular measurement instrument 10 includes a laser module 34 to assist with this particular type of application. The laser module is mounted within the interior space of the casing 12 and is electrically connected to the power source 20. A "laser" button 36 is mounted on the casing 12 and connected to the laser module 34 such that depression thereof causes a light beam to be emitted from the laser module 34 through an aperture defined in a side wall 18 of the casing (FIG. 1). Therefore, a user can first identify a desired angle relative to a reference surface and then emit a light beam at that angle so as to identify the precise location upon a distant surface where the support beam needs to be attached (i.e. where the support beam needs to terminate).

Optionally, the microprocessor 24 may include a memory element 26 (FIG. 2) or may be electrically connected to another memory component. A "memory" button 32 is mounted to the casing 12 and is electrically connected to the microprocessor 24. When a user depresses the "memory" button 32, the microprocessor 24 is capable of storing in memory 26 an angular displacement value displayed upon the display 38. The microprocessor 24 is further capable of energizing a sound generator, such as a piezoelectric buzzer 39, when a subsequently calculated angular displacement value is equal to the value stored in memory. Of course, the microprocessor 24 could be programmed to store multiple values in memory 26 and accessed upon demand.

Various other gyroscopes may be utilized with this instrument 10, such as a fiber optic gyroscope (FOG). In a FOG, two counterpropagating light beams travel through an optical coil and experience time differences proportional to the degree of rotation of the coil. These differences are reflected in phase difference between optical waves measured by interferometer principles. This data may be delivered to the microprocessor for calculating inertia angular displacement. A ring laser, piezoelectric, or other micromachined gyroscopes would also work with the present instrument.

In use, the 3D angular measurement instrument 10 may be utilized for both vertical and horizontal applications in multiple settings. The device is especially useful in construction, carpentry, and manufacturing as shown in FIG. 4. Oriented in a vertical configuration with a side wall 18 bearing against a reference surface 6, a reference plane may be established by a user depression of the reset button 30.

The casing 12 may then be rotated about an imaginary axis extending normally through the display 38 until it rests upon another surface 8 having an unknown angle. The angle of the second surface 8 relative to the reference surface 6 is displayed upon the display 38. Thus, the angles of existing constructive elements may be determined or verified. Alternatively, the casing 12 may be rotated to a desired angular displacement relative to the reference plane for the purpose of determining the position at which a second (new) surface 8 should be attached (e.g. a support beam, rafter, etc.). The laser module 34 may be utilized in this context to show where a distal end of the second surface 8 should be attached to another structure.

Another use of the angular measurement instrument 10 is to determine the proper angle of a staircase in relation to a floor surface. Since the floor itself may not be level relative to the Earth's surface, it is important to use the floor as the reference surface so that the staircase is constructed in aesthetic and functional proportion. Using the floor as the reference surface by pressing the reset button with the casing in a vertical configuration thereon, the angle of a staircase support beam may be determined or verified in the manner described previously. The right angles of each succeeding stair may be similarly determined relative to a previous stair.

Another use of the angular measurement instrument 10 regards determining the desired angles of pipes, ducts, or other tubular assemblies. For example, a tradesman may desire to weld or otherwise connect two pipes at a predetermined angle. Using a first pipe as the reference plane, the casing 12 may be rotated in the same axis and will display the angular displacement of such rotation. The second pipe may be connected at the desired angular relation.

Yet another use of the angular measurement instrument 10 is in plant or retail space management. This use is very similar to that shown in FIG. 5 and described previously. In plant management, certain machinery must be positioned in precise angular positions relative to one another. Accordingly, a user may establish a wall as a reference plane with the casing 12 in a horizontal orientation and then rotate the casing 12 within that plane to a desired angle whereat to position a first machine. Then using the first machine as a reference plane, the casing 12 may be further rotated within a horizontal plane until a desired angle for placement of a second machine relative to the first machine is displayed. It is understood that the measurement instrument 10 may be carried great distances between a reference point and the location where the second machine is to be placed and this distance does not cause an incorrect angular displacement.

This instrument 10 may also be utilized in determining desired angles for excavation, heavy equipment directional operations, landscaping, architectural and graphic arts renderings, and any other applications in which the angle of one plane relative to another plane needs to be determined or verified without reference to or being influenced by gravity or magnetic attraction. It should be appreciated that this instrument 10 enables any two planes within the same geometric axis to be compared or measured relative to one another. It is, therefore, three dimensional and unaffected by any gravitational forces and could even be used in a non-gravitational environment such as space.

Figure 3:
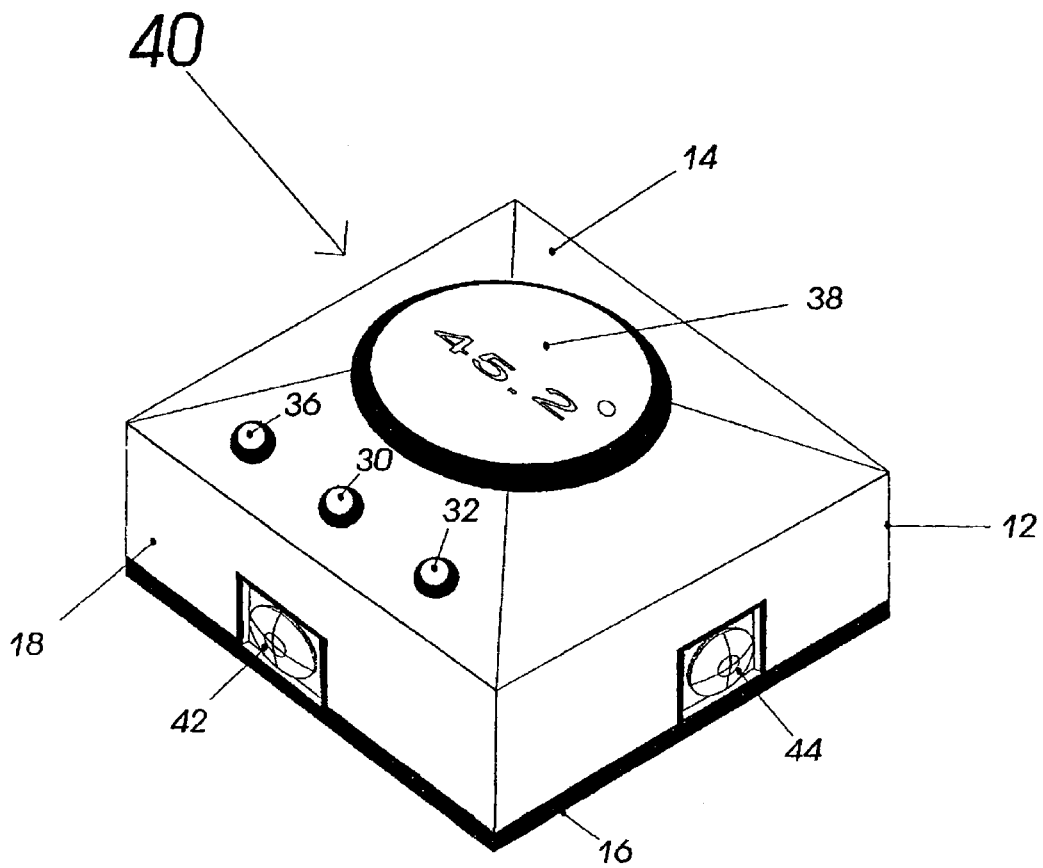
FIG. 3 is a perspective view of a 3D angular measurement instrument according to another embodiment of the present invention.

Another embodiment of the 3D angular measurement instrument 40 is shown in FIG. 3 and is substantially similar in construction to the embodiment first described above except as specifically noted below. The instrument 40 according to this embodiment includes at least one but preferably a pair of bubble levels mounted to respective side walls 18 of the casing 12 for providing a visual indication indicative of an inclination of the casing 12 with respect to Earth's surface. One bubble level 42 includes a longitudinal axis perpendicular to top 14 and bottom 16 walls while another bubble level 44 includes a longitudinal axis parallel to the top 14 and bottom 16 walls. These bubble levels enable a user to compare a reference surface with a "true" level plane. An inclinometer or accelerometer which operate on gravitational forces may also be used. For example, a user may desire to first determine whether a floor is truly level in a conventional manner prior to using the floor as a reference plane.

Therefore, it can be seen that the present invention overcomes the limitations of other measurement instruments in that the present instrument does not operate using gravitational forces. This invention provides a self-contained instrument for measuring angular displacement from a user-selected reference plane on the horizontal axis (i.e. on any plane-axis).

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A portable, handheld 3D angle measurement instrument for measuring angular displacement along any plane axis, comprising:
   a handheld casing;
   a battery positioned in said casing;
   a microelectromachined gyroscope positioned in said casing and electrically connected to said battery, said gyroscope capable of measuring acceleration/deceleration velocity and generating an output signal, said output signal being a voltage proportional to a corresponding angular inertia velocity; and
   a microprocessor positioned in said casing and electrically connected to said battery and said gyroscope for receiving said output signal, wherein said microprocessor calculates an angular displacement value using said output signal and a predetermined time factor.

2. The measurement instrument as in claim 1 further comprising a reset button on said casing and electrically connected to said microprocessor for selectably resetting a reference point to zero, whereby a calculation using a subsequent output signal yields an angular displacement value offset from said reset reference point.

3. The measurement instrument as in claim 1 wherein:
   said casing includes a generally square-shaped configuration having bottom and top walls with side walls extending therebetween;
   means for displaying said angular displacement value in degrees offset from a reference point, said means for displaying including an electronic display mounted on said top wall and electrically connected to said microprocessor for displaying said angular displacement value.

4. The measurement instrument as in claim 1 further comprising means for filtering said output signal, whereby to remove undesired electronic noise and unintended angular movements caused by human vibrations.

5. The measurement instrument as in claim 1 further comprising:
   a memory electrically connected to said microprocessor for selectively storing at least one angular displacement value calculated by said microprocessor;

a sound generator; and wherein said microprocessor is adapted to energize said sound generator when a subsequently calculated angular displacement value equals a respective stored angular displacement value.

6. The measurement instrument as in claim 1 further comprising a laser module positioned in said casing and electrically connected to said battery, said laser module adapted to selectably emit a laser beam through an aperture defined by one side wall of said casing, said laser beam being emitted along an imaginary axis corresponding to an angular orientation of said casing.

7. The measurement instrument as in claim 1 further comprising means for visually indicating an inclination of said casing with respect to the Earth's surface.

8. A portable, handheld 3D angle measurement instrument for measuring angular displacement along any plane axis, comprising:

a handheld casing having bottom and top walls with side walls extending therebetween, said casing defining an interior space;

a battery positioned in said interior space of said casing;

a microelectromachined gyroscope positioned in said interior space and electrically connected to said battery, said gyroscope capable of measuring acceleration/deceleration velocity and generating a corresponding analog output signal, said output signal being indicative of a voltage proportional to a corresponding angular velocity;

a microprocessor positioned in said casing and electrically connected to said battery a said gyroscope for receiving said output signal, wherein said microprocessor calculates an angular displacement value using said output signal received over a predetermined period of time;

a button mounted on said casing and electrically connected to said microprocessor for selectably setting a reference point; and means in said microprocessor for converting said angular displacement value to a number of degrees offset from said reference point.

9. The measurement instrument as in claim 8 further comprising an electronic display electrically connected to said microprocessor for displaying said converted angular displacement value.

10. The measurement instrument as in claim 8 further comprising means for filtering said output signal, whereby to remove undesired electronic noise and unintended angular movements caused by human vibrations.

11. The measurement instrument as in claim 8 further comprising a sound generator;

wherein said microprocessor includes a memory for selectively storing at least one angular displacement value calculated by said microprocessor; and wherein said microprocessor is adapted to energize said sound generator when a subsequently calculated angular displacement value equals a respective stored angular displacement value.

12. The measurement instrument as in claim 11 further comprising a laser module positioned in said casing and electrically connected to said battery, said laser module adapted to selectably emit a laser beam through an aperture defined by one side wall of said casing.

13. The measurement instrument as in claim 11 further comprising means for visually indicating an inclination of said casing with respect to the Earth's surface.

14. The measurement instrument as in claim 8 further comprising a laser module positioned in said casing and electrically connected to said battery, said laser module adapted to selectably emit a laser beam through an aperture defined by one side wall of said casing, said laser beam being emitted along an imaginary axis corresponding to an angular orientation of said casing.

15. The measurement instrument as in claim 8 further comprising means for visually indicating an inclination of said casing with respect to the Earth's surface.

16. A method for measuring angular displacement along any plane axis, comprising:

providing a handheld casing including a microelectromachined gyroscope and a microprocessor;

measuring with said microelectromachined gyroscope acceleration/deceleration velocities resulting from angular movement of said casing;

calculating with said microprocessor an angular displacement value by integrating said measured velocities in relation to a time factor associated with said measured velocities;

converting said angular displacement value into an angular degree measurement offset from a user-selected angular reference plane; and displaying said angular degree measurement.

17. The method as in claim 16 further comprising:

selectively storing said angular displacement value; and emitting an audible sound when a subsequently calculated angular displacement value is equal to a stored angular displacement value.

18. The method as in claim 16 further comprising:

providing at least one bubble level on said casing for visually indicating an inclination of said casing relative to the Earth's surface; and providing a laser module in said casing for selectively emitting a laser beam along an imaginary axis corresponding to an angle of inclination of said casing.

* * * * *